United States Patent
Satish

(10) Patent No.: US 8,255,902 B1
(45) Date of Patent: Aug. 28, 2012

(54) SYSTEMS AND METHODS FOR DETERMINING AND QUANTIFYING THE IMPACT OF AN APPLICATION ON THE HEALTH OF A SYSTEM

(75) Inventor: Sourabh Satish, Fremont, CA (US)

(73) Assignee: Symantec Corporation, Mountain View, CA (US)

(*) Notice: Subject to any disclaimer, the term of this patent is extended or adjusted under 35 U.S.C. 154(b) by 1037 days.

(21) Appl. No.: 12/049,751

(22) Filed: Mar. 17, 2008

(51) Int. Cl.
G06F 9/445 (2006.01)
G06F 9/44 (2006.01)
G06F 12/14 (2006.01)

(52) U.S. Cl. .................. 717/174; 717/168; 713/189
(58) Field of Classification Search .................. 717/174
See application file for complete search history.

(56) References Cited

U.S. PATENT DOCUMENTS

| | | | |
|---|---|---|---|
| 6,321,348 B1* | 11/2001 | Kobata .................. 714/37 |
| 6,477,471 B1* | 11/2002 | Hedstrom et al. .................. 702/34 |
| 6,633,640 B1* | 10/2003 | Cohen et al. .................. 379/265.03 |
| 7,089,552 B2* | 8/2006 | Atallah .................. 717/175 |
| 7,269,851 B2* | 9/2007 | Ackroyd .................. 726/24 |
| 7,602,898 B2* | 10/2009 | Klein et al. .................. 379/265.01 |
| 7,831,412 B1* | 11/2010 | Sobel et al. .................. 702/186 |
| 7,890,952 B2* | 2/2011 | Marion et al. .................. 717/176 |
| 7,966,278 B1 | 6/2011 | Satish |
| 8,046,755 B2* | 10/2011 | Gaa-Frost et al. .................. 717/177 |
| 8,156,477 B2* | 4/2012 | Rozenfeld .................. 717/127 |
| 2003/0115570 A1* | 6/2003 | Bisceglia .................. 717/101 |
| 2004/0205167 A1* | 10/2004 | Grumann .................. 709/220 |
| 2005/0021733 A1* | 1/2005 | Clinton et al. .................. 709/224 |
| 2005/0233295 A1* | 10/2005 | Chiszar et al. .................. 434/350 |
| 2005/0257199 A1* | 11/2005 | Johansson et al. .................. 717/126 |
| 2005/0283622 A1* | 12/2005 | Hall et al. .................. 713/190 |
| 2005/0283831 A1 | 12/2005 | Ryu et al. |
| 2006/0010345 A1* | 1/2006 | Schnoebelen et al. .................. 714/25 |
| 2006/0080658 A1* | 4/2006 | Marion et al. .................. 717/177 |
| 2006/0253584 A1 | 11/2006 | Dixon et al. |
| 2007/0016953 A1 | 1/2007 | Morris et al. |
| 2007/0038983 A1* | 2/2007 | Stienhans .................. 717/127 |
| 2007/0157195 A1* | 7/2007 | Gaa-Frost et al. .................. 717/174 |
| 2007/0162458 A1 | 7/2007 | Fasciano |
| 2007/0300215 A1* | 12/2007 | Bardsley .................. 717/168 |

(Continued)

OTHER PUBLICATIONS

Lovrek et al., "Improving Software Maintenance by using Agent-based Remote Maintenance Shell", © 2003 IEEE, retrieved from <http://ieeexplore.ieee.org/stamp/stamp.jsp?tp=&arnumber=1235454>, total pp. 10.*

(Continued)

Primary Examiner — Don Wong
Assistant Examiner — Marina Lee
(74) Attorney, Agent, or Firm — Advantedge Law Group

(57) ABSTRACT

A computer-implemented method for determining whether an application impacts the health of a system may comprise detecting an application, performing a first system-health evaluation, allowing the application to install on the system, performing a second system-health evaluation after the application is installed on the system, and comparing the second system-health evaluation with the first system-health evaluation to determine whether the application impacted the health of the system. Exemplary methods for determining the potential impact of an application on the health of a system and for calculating a system-health-impact score for an application based on information gathered from a plurality of systems are also disclosed. Corresponding systems and computer-readable media are also disclosed.

14 Claims, 11 Drawing Sheets

U.S. PATENT DOCUMENTS

| | | | |
|---|---|---|---|
| 2008/0141240 A1* | 6/2008 | Uthe | 717/174 |
| 2008/0172420 A1* | 7/2008 | Konik et al. | 707/202 |
| 2008/0307413 A1* | 12/2008 | Ferris et al. | 717/178 |
| 2009/0055340 A1* | 2/2009 | Lakshminarayanan et al. | 706/47 |
| 2009/0133126 A1 | 5/2009 | Jang et al. | |
| 2009/0138856 A1 | 5/2009 | Oja et al. | |
| 2009/0172818 A1* | 7/2009 | Sutherland et al. | 726/25 |
| 2010/0082803 A1* | 4/2010 | Nguyen | 709/224 |
| 2010/0154027 A1* | 6/2010 | Sobel et al. | 726/1 |
| 2010/0192196 A1* | 7/2010 | Lee | 726/1 |

OTHER PUBLICATIONS

Satish, Sourabh; U.S. Appl. No. 11/394,846, filed Mar. 31, 2006.
Non-Final Office Action received in U.S. Appl. No. 11/394,846; Mar. 6, 2009.
Final Office Action received in U.S. Appl. No. 11/394,846; Sep. 1, 2009.
Non-Final Office Action received in U.S. Appl. No. 11/394,846; Feb. 23, 2010.
Final Office Action received in U.S. Appl. No. 11/394,846; Jul. 22, 2010.
Non-Final Office Action received in U.S. Appl. No. 11/394,846; Dec. 9, 2010.
Satish, Sourabh; U.S. Appl. No. 12/056,379, filed Mar. 27, 2008.
Final Office Action received in U.S. Appl. No. 11/394,846; May 12, 2011.
William E. Sobel; U.S. Appl. No. 12/059,003, filed Mar. 31, 2008.
Non-Final Office Action received in U.S. Appl. No. 12/059,003; Aug. 18, 2011.
Keith Newstadt et al; U.S. Appl. No. 13/291,773, filed Nov. 8, 2011.
Carey S. Nachenberg; U.S. Appl. No. 12/415,834, filed Mar. 31, 2009.
Non-Final Office Action received in U.S. Appl. No. 12/415,834; Oct. 11, 2011.

* cited by examiner

First System-Health Evaluation
400

First Stability Index 402

| | |
|---|---|
| Running Average of Blue-Screen Errors | 0 |
| Running Average of Service Errors | 1 |
| Running Average of Application Errors | 1 |

⎬ 404

⎬ 406

First Performance Index 412

| | |
|---|---|
| Running Average of CPU Usage | 2.1875 |
| Maximum CPU Usage | 7 |
| Running Average of Page Faults | 248.4375 |
| Maximum Number of Page Faults | 844 |
| Running Average of IP Datagrams | 3.2500 |
| Maximum Number of IP Datagrams | 8 |

⎬ 414

⎬ 416

Second System-Health Evaluation
420

Second Stability Index 422

| | |
|---|---|
| Running Average of Blue-Screen Errors | 0 |
| Running Average of Service Errors | 2 |
| Running Average of Application Errors | 3 |

⎬ 424

⎬ 426

Second Performance Index 432

| | |
|---|---|
| Running Average of CPU Usage | 10.1999 |
| Maximum CPU Usage | 58 |
| Running Average of Page Faults | 960.8500 |
| Maximum Number of Page Faults | 3423 |
| Running Average of IP Datagrams | 3.2500 |
| Maximum Number of IP Datagrams | 9 |

⎬ 434

⎬ 436

System-Health-Impact Scores
440

Stability Impact 442

| | |
|---|---|
| Blue-Screen Errors Impact | 0% |
| Service Errors Impact | -50% |
| Application Errors Impact | -50% |

Performance Impact 446

| | |
|---|---|
| Average CPU Usage Impact | -78.5539% |
| Maximum CPU Usage Impact | -87.9130% |
| Average Page Faults Impact | -74.1440% |
| Maximum Page Faults Impact | -75.3433% |
| Average IP Datagrams Impact | 0% |
| Maximum IP Datagrams Impact | -11.1111% |

Average System-Health Impact 448

| | |
|---|---|
| Average Stability Impact | -33.3333% |
| Average Performance Impact | -55.5109% |
| Average System-Health Impact | -44.4421% |

FIG. 4

SYSTEMS AND METHODS FOR DETERMINING AND QUANTIFYING THE IMPACT OF AN APPLICATION ON THE HEALTH OF A SYSTEM

BACKGROUND

Literally thousands of computer programs and applications are available for installation on modern-day computing devices, such as the personal computer. Unfortunately, a user of a computing device is typically unable to determine whether an application will impact the health (e.g., the performance or stability) of the computing device before installing the application on the computing device. Because vendor-supplied information detailing the potential impact of an application on the health of a computing device may not be reliable, users may turn to elaborate reviews of applications published on the web by professional reviewers or other users of the application. Such reviews, however, suffer from a number of deficiencies.

For example, a review of an application may not detail the impact the application had on the health of the reviewer's computing device. In addition, even if a reviewer wishes to highlight the perceived impact of an application on the health of the reviewer's computing device, the reviewer may have difficulty determining the precise impact the application had on the computing device's health due to the high number of applications typically installed on computing devices. Moreover, reviewers of an application may not be motivated to post a review of an application unless the reviewer experiences (or at least perceives) problems with the application. As such, reviews of an application may wrongly focus on perceived problems or weaknesses of an application.

In the absence of reliable information, users may not become aware of the negative impact of an application until after the application has been installed. Unfortunately, in some instances the negative effects of an application on a computing device may not be reversed simply by uninstalling the application.

SUMMARY

As will be described in greater detail below, embodiments of the instant disclosure may enable users to determine and quantify the impact an installed application has on the health of a computing system. Additional embodiments may also enable users to determine, prior to installing a new application, the potential impact the new application may have on the health of the user's computing system based on information obtained from additional computing systems on which the application has previously been installed.

For example, the impact an application has on the health of a computing system may be determined by: 1) detecting the application as it is downloaded to or loaded onto a computing system, 2) performing a baseline evaluation of the system's health before the application is installed, 3) allowing the application to be installed on the system, 4) performing a second evaluation of the system's health after the application is installed, and then 5) comparing the results of the second evaluation with the results of the first evaluation to determine whether the application impacted the health of the system.

The health of a system may be evaluated in a variety of ways. For example, the health of a system may be evaluated by evaluating the performance or stability of the system using various performance or stability metrics, such as the processor, memory, and network usage of the system, the number of operating-system, application, service, or device-driver errors experienced by the system, system uptime, and system reboots (such as the number of system reboots per day).

The results of each evaluation of a system's health may be compared either locally by the system itself or remotely by a backend or server. For example, a module may, after evaluating the health of a system both before and after an application is installed, transmit the results of the evaluations to a backend, which backend may then remotely determine whether the application impacted the health of the system by comparing the results of the evaluations. In certain embodiments, a unique identifier associated with an application, such as a name of the application or a checksum calculated for the application's installer, may also be transmitted along with the results of the evaluations to the backend.

As will be discussed in greater detail below, the impact of an application on the health of a system may be expressed or quantified by a system-health-impact score. In certain embodiments, this system system-health-impact score may be normalized in order to allow system-impact-health scores obtained from a plurality of systems, each of which may have varying characteristics (such as processor speeds, memory amounts, and the like), to be accurately compared.

In one embodiment, the method may comprise determining whether the system executed or ran the installed application before the second system-health evaluation was performed and, if so, assigning a higher level of confidence to the system-health-impact score since such a situation may provide a more accurate representation of the impact of the application on the health of the system. The method may also comprise identifying all data, files, and system changes associated with, or that result from installing, the application and then associating these files, data, and system changes with a single file, such as an executable file, associated with the application. In addition, the second evaluation of the system's health may be performed before a second new application is fully installed on the system in order to eliminate additional variables.

As detailed above, additional embodiments may also enable users to determine the potential impact of an application on the health of a computing system prior to installing the application based on information obtained from additional computing systems (potentially millions) on which the application has previously been installed. For example, the potential impact of an application on the health of a system may be determined by: 1) detecting an application as it is downloaded to or loaded onto the system, 2) identifying a unique identifier (such as a program name or checksum) for the application, 3) transmitting the unique identifier, along with a request for information that details the potential health impact of the application, to a server, 4) receiving the health-impact information for the application from the server, and then 5) determining, based on the health-impact information received from the server, whether to install the application.

In certain embodiments, determining whether to install the application may comprise displaying the health-impact information (such as a system-health-impact score for the application) in a user interface (which may be either locally executed or web-based) and then prompting a user to allow or deny installation of the application. In an additional embodiment, determining whether to install the application may comprise automatically allowing or preventing installation of the application based on the health-impact information received from the server.

Additional embodiments may comprise receiving health-impact information for a single application from a plurality of systems and then calculating a system-health-impact score for the application based on this information. For example, a method for calculating a system-health-impact score for an application based on information obtained from a plurality of systems may comprise receiving, at a server or backend, health-impact information for the application from a first system, receiving health-impact information for the application from a second system, and then calculating a system-health-impact score for the application based on the health-impact information received from the first system and the health-impact information received from the second system. The method may also comprise receiving a request from a third system for the system-health-impact score for the application and then transmitting the system-health-impact score for the application to the third system. Corresponding systems and computer-readable media are also disclosed.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram illustrating the results of exemplary system-health evaluations that may be performed according to at least one embodiment.

Figure 1:
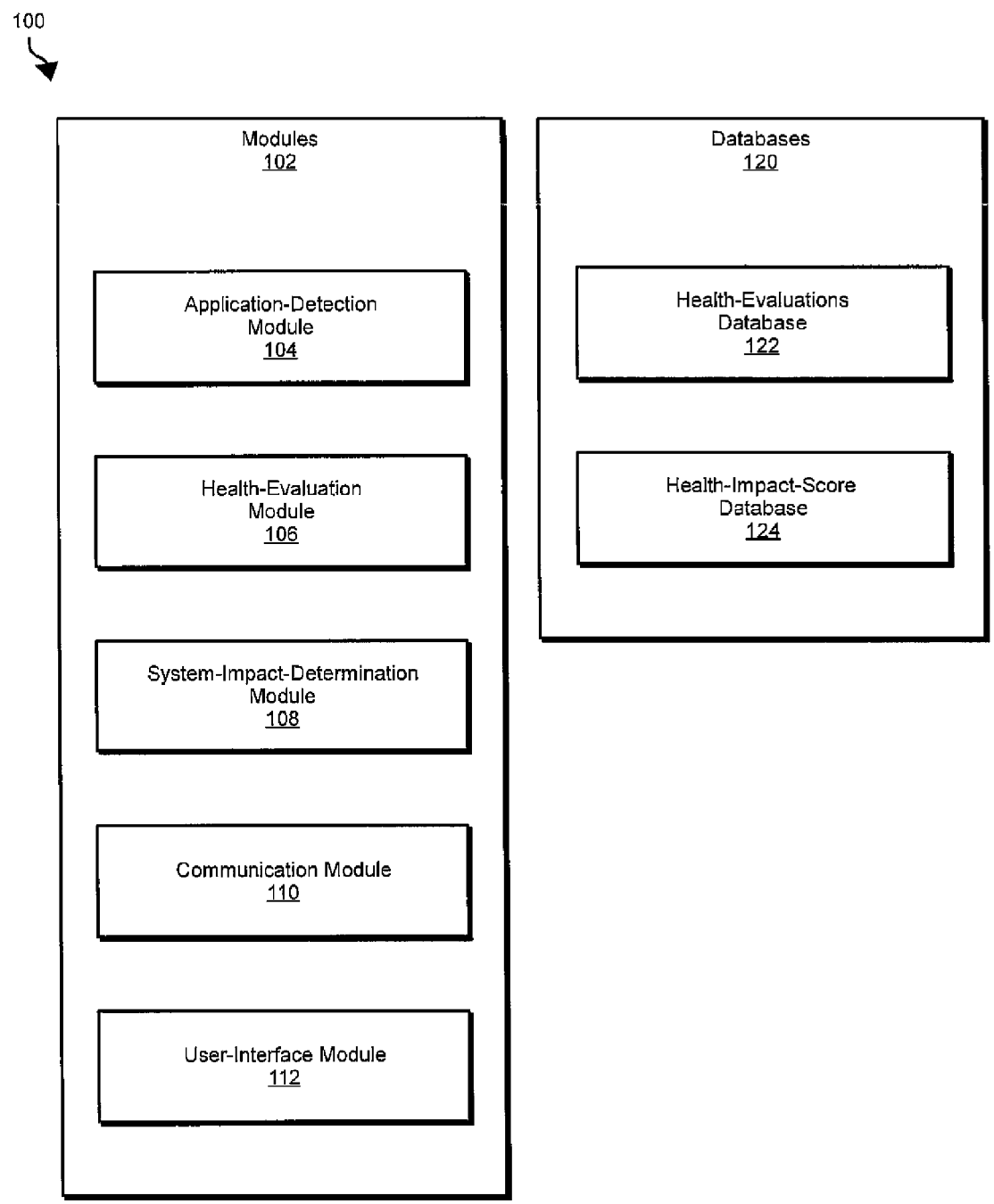
FIG. 1 is a block diagram of an exemplary system for determining the impact of an application on the health of a computing system according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for determining and quantifying the impact of an application on the health of a computing system. Systems and methods for determining the potential impact of an application on the health of a computing system based on information obtained from additional computing systems on which the application has previously been installed are also disclosed. The term "health," as used herein, generally refers to the overall wellness of a computing system. As detailed below, in certain embodiments the health of a computing system may be determined by evaluating the performance, stability, and/or state of security of the computing system.

Figure 2:
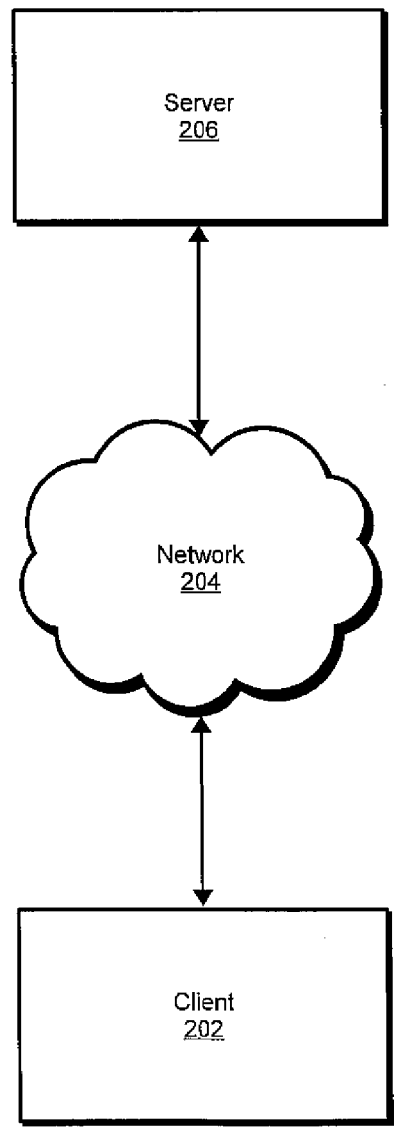
FIG. 2 is a block diagram of an exemplary network-based system for determining the impact of an application on the health of a computing system according to at least one embodiment.
Figure 8:
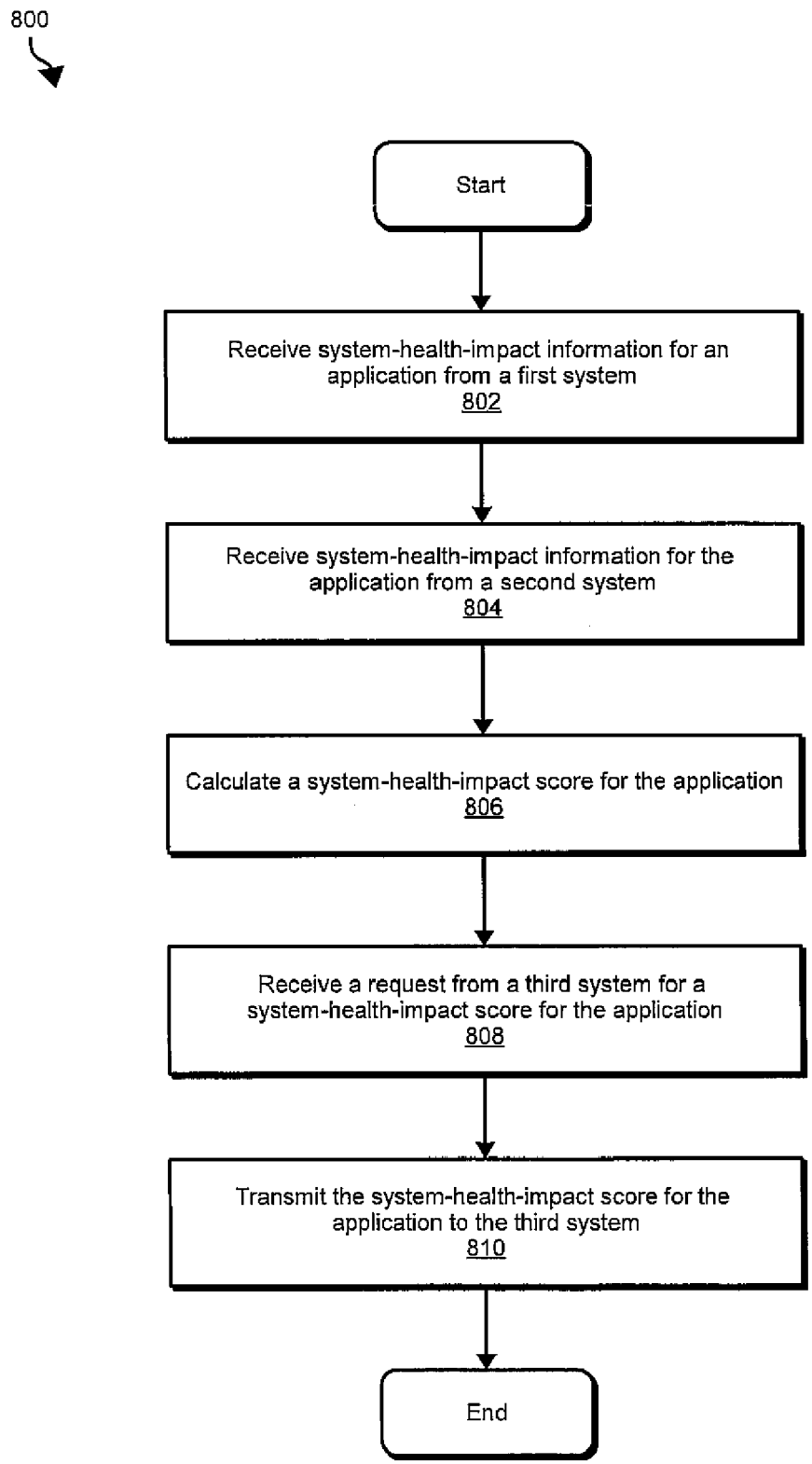
FIG. 8 is a flow diagram of an exemplary computer-implemented method for calculating a system-health-impact score for an application based on information obtained from a plurality of systems according to one embodiment.
Figure 9:
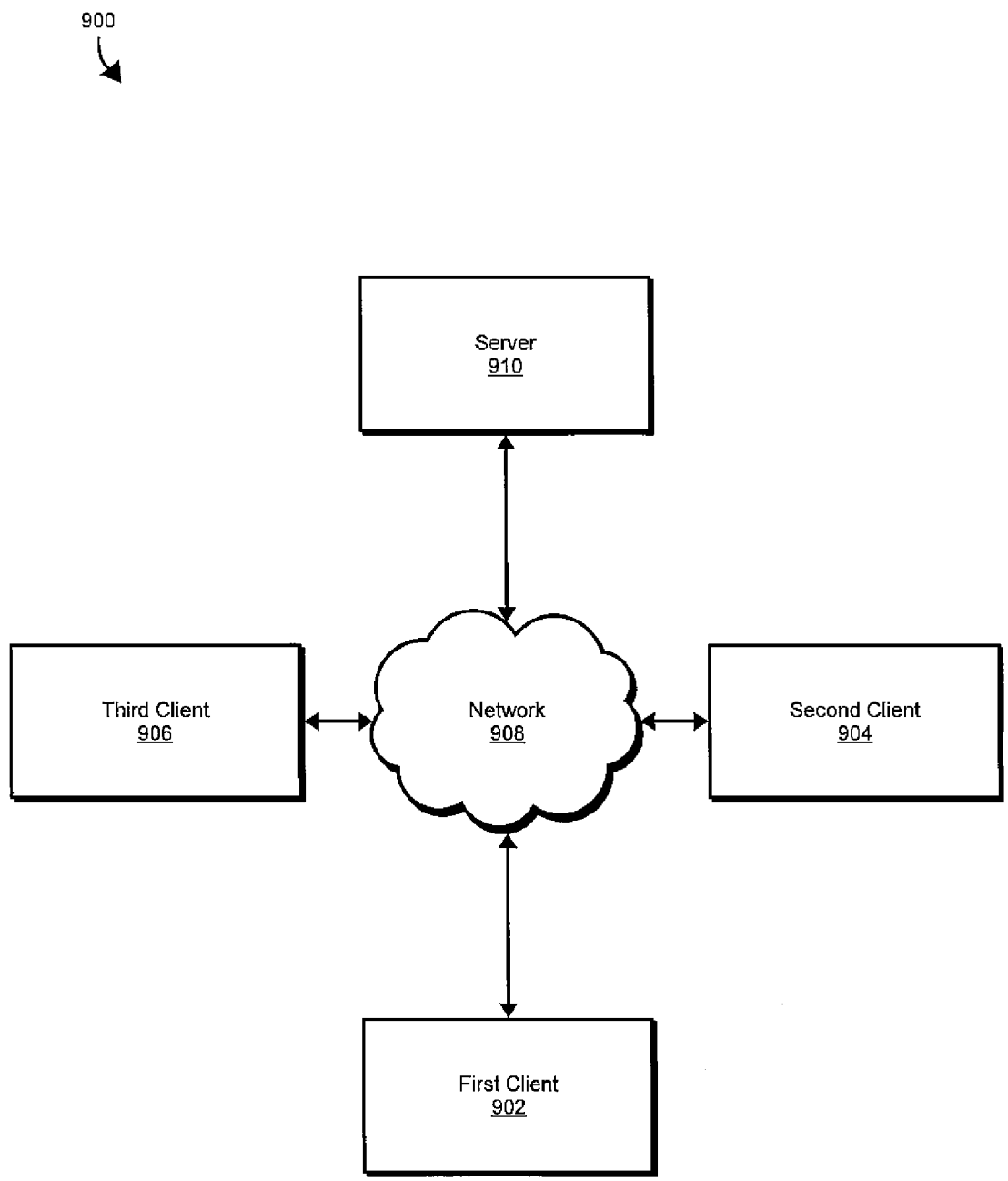
FIG. 9 is a block diagram of an exemplary network-based system for determining the impact of an application on the health of a computing system according to at least one embodiment.

The following will provide, with reference to FIGS. 1, 2, and 9, detailed descriptions of exemplary systems for: 1) determining whether an application impacted the health of a computing system and 2) determining the potential impact of an application on the health of a computing system based on information obtained from additional computing systems on which the application has previously been installed. An illustration of the results of exemplary system-health evaluations that may be performed by the system is provided in FIG. 4. A description of a corresponding exemplary user interface for use with these systems is provided in connection with FIG. 7. Detailed descriptions of corresponding exemplary computer-implemented methods will also be provided in connection with FIGS. 3, 5-6, and 8.

FIG. 1 is a block diagram of an exemplary system 100 for determining whether a new application impacted the health of a computing system and for determining the potential impact of an application on the health of a computing system based on information obtained from additional computing systems on which the application has previously been installed. As illustrated in this figure, exemplary system 100 may comprise one or more modules 102 for performing one or more tasks. For example, exemplary system 100 may comprise an application-detection module 104 for detecting applications downloaded, stored, or installed on a system. Exemplary system 100 may also comprise a health-evaluation module 106 for evaluating the health of a computing system (hereafter "system-health evaluations") and a system-impact-determination module 108 for determining, based on these system-health evaluations, the impact of an application on a system's health. Exemplary system 100 may also comprise a communication module 110 for facilitating communication between a computing system (such as a user's system) and a server or backend and a user-interface module 112 for providing a user interface.

As illustrated in FIG. 1, exemplary system 100 may also comprise one or more databases 120. For example, exemplary system 100 may comprise a health-evaluations database 122 for storing the results of one or more system-health evaluations. Exemplary system 100 may also comprise a health-impact-score database 124 for storing scores that represent or quantify the impact an application has had on the health of computing systems (hereafter, "health-impact scores"). As will be described in greater detail below, health-impact scores may be calculated based on information obtained from a plurality of computing systems on which the application has been installed. Although illustrated as separate devices, one or more of databases 120 may represent portions of a single database or a single computing device.

In certain embodiments, one or more of modules 102 may represent one or more software applications or programs that, when executed by a computing device, may cause the computing device to perform one or more tasks required to determine whether an application impacted the health of a computing system and/or to determine whether an application may impact the health of a computing system based on information obtained from a plurality of additional computing systems. For example, as will be described in greater detail below, one or more of modules 102 may represent software modules configured to run on one or more computing devices; such as client 202 in FIG. 2, server 206 in FIG. 2, computing system 1010 in FIG. 10, and/or portions of exemplary network architecture 1100 in FIG. 11. One or more of modules 102 may also represent all or portions of one or more special-purpose computers configured to perform one or more tasks required to determine whether an application impacted the health of a computing system and/or to determine whether an application may impact the health of a system based on information obtained from a plurality of additional computing systems.

In addition, one or more of databases 120 may represent a portion of one or more computing devices. For example, one or more of databases 120 may represent a portion of client 202 in FIG. 2, server 206 in FIG. 2, exemplary computing system 1010 in FIG. 10, and/or portions of exemplary network architecture 1100 in FIG. 11. Alternatively, one or more of databases 120 may represent one or more physically separate devices capable of being accessed by a computing device, such as client 202 in FIG. 2, server 206 in FIG. 2, computing system 1010 in FIG. 10, and/or portions of exemplary network architecture 1100 in FIG. 11.

Exemplary system 100 in FIG. 1 may be deployed in a variety of ways. For example, all or a portion of exemplary system 100 may represent portions of a network-based system. FIG. 2 is an illustration of an exemplary network-based system 200 for determining whether an application impacted the health of a system and for determining whether an application may impact the health of a system based on information obtained from a plurality of additional systems. As illustrated in this figure, exemplary system 200 may comprise a client 202 in communication with a server 206 via a network 204.

Client 202 generally represents any type or form of client-side computing device, such as a user's computing device, capable of executing computer-readable instructions. In certain embodiments, client 202 may comprise one or more portions of exemplary system 100 in FIG. 1. For example, one or more of modules 102 in FIG. 1 may be stored and configured to run on client 202. Similarly, one or more of databases 120 in FIG. 1 may represent portions of client 202 in FIG. 2.

In at least one embodiment, client 202 may communicate with server 206 via network 204. Network 204 generally represents any type or form of communication or computing network; including, for example, an intranet, a wide area network (WAN), a local area network (LAN), a personal area network (PAN), or the Internet.

As illustrated in FIG. 2, exemplary system 200 may also comprise a server 206. Server 206 generally represents any type or form of server-side computing device, such as a back-end. In certain embodiments, server 206 may comprise one or more portions of exemplary system 100 in FIG. 1. For example, one or more of modules 102 from FIG. 1 may be stored and configured to run on server 206. Similarly, server 206 may comprise one or more of databases 120 in FIG. 1.

Figure 3:
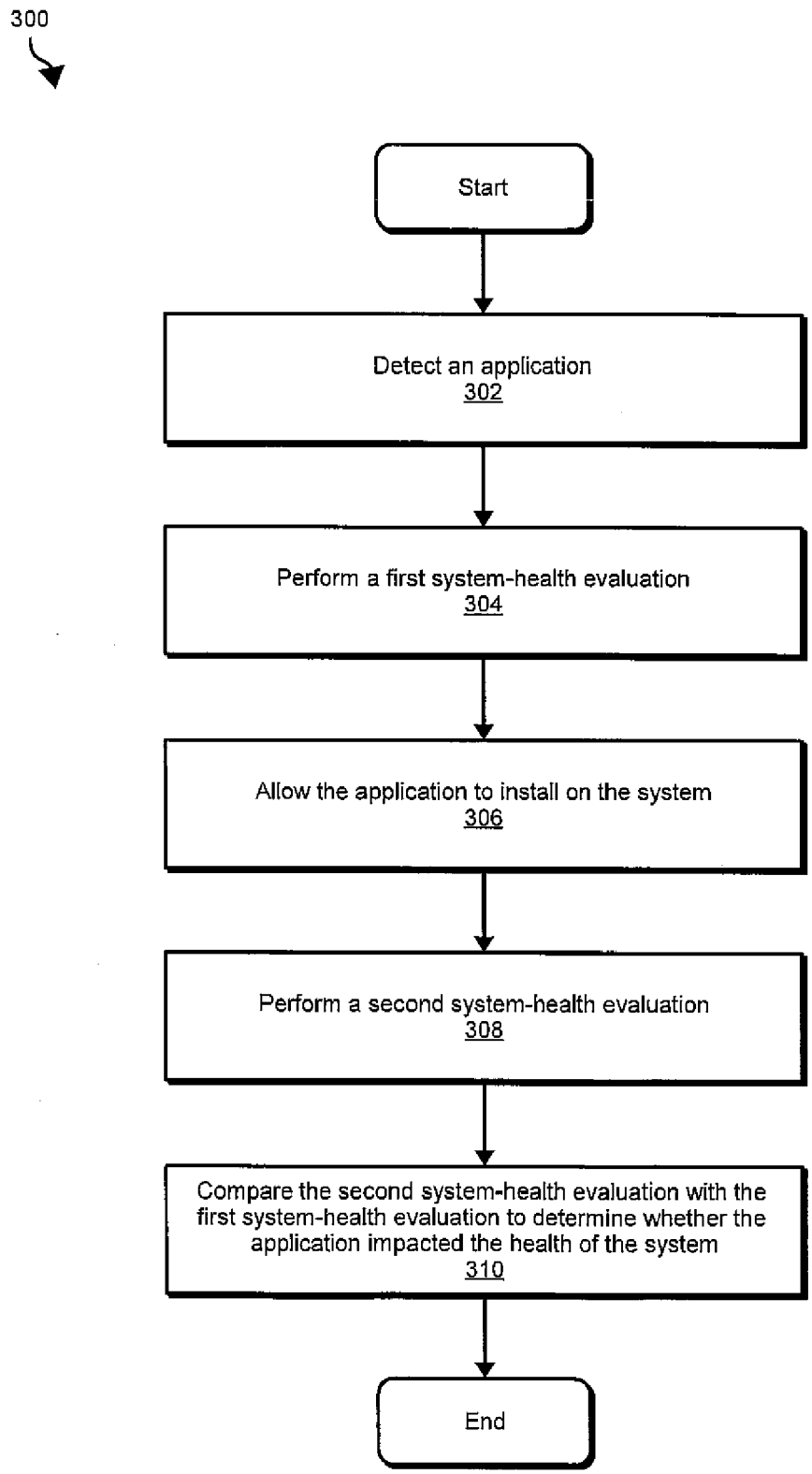
FIG. 3 is a flow diagram of an exemplary computer-implemented method for determining whether an application installed on a computing system impacted the health of the system according to at least one embodiment.

FIG. 3 is a flow diagram of an exemplary computer-implemented method 300 for determining whether an application impacts the health of a system. As illustrated in this figure, at step 302 a new application may be detected. For example, application-detection module 104 in FIG. 1 may detect a new application downloaded onto, loaded onto, or stored on client 202 in FIG. 2. The phrase "application," as used herein, generally refers to any type or form of application software, including installation applications and installers.

New applications may be detected in step 302 a variety of ways. For example, in certain embodiments application-detection module 104 in FIG. 1 may detect a new application by file type (e.g., MSI), by name (e.g., setup.exe or install.exe), or by determining the source of the file (e.g., internet browser, e-mail client, etc.).

Applications may be detected either prior to being installed on a system or shortly after being installed on a system. For example, application-detection module 104 may detect a new application that is downloaded to, stored on, or loaded onto client 202 before the application is fully installed on client 202. In alternative embodiments, application-detection module 104 may detect a new application shortly after the application is fully installed on client 202. In at least one embodiment, application-detection module 104 in FIG. 1 may also determine whether an application downloaded to, stored on, loaded onto, or installed on client 202 modified at least one setting of client 202.

In at least one embodiment, detecting an application in step 302 may also comprise identifying all data, files, and system changes associated with, or that result from installing, the application. For example, application-detection module 104 in FIG. 1 may detect: 1) all shared and non-shared program files created or modified by the new application, 2) all folders and directories created or modified by the new application, 3) any registry entries created or modified by the new application, 4) any configuration file entries created or modified by the new application, 5) any environment variables created or modified by the new application, and/or 6) any links or shortcuts created by the new application.

In addition, in certain embodiments all data, files, and system changes associated with or that result from installing an application may, after being identified, be associated with a single file, such as an executable file, associated with the application. For example, application-detection module 104 in FIG. 1 may, after identifying all data, files, and system changes associated with or that result from installing the application "MYPROG," associate each of these data, files, and system changes with the installation file "myprog_setup.exe" for the application "MYPROG." In certain embodiments, such an association may enable system 100 in FIG. 1 to accurately determine and track the impact of a single application on the health of a system, even if installation of the single application results in the creation of numerous files or system changes.

At step 304, the current state of health of the computing system may be determined by performing a first system-health evaluation. As will be explained in greater detail below, this "first" system-health evaluation may be used as reference or baseline health evaluation for later comparison with subsequent system-health evaluations to determine whether the application detected in step 302 impacted the health of the computing system. The phrase "system-health evaluation," as used herein, generally refers to any type or form of evaluation used to determine the health of a computing system. Examples of system-health evaluations include, without limitation, performance evaluations (which may measure the performance of various aspects of a computing system, such as memory usage, CPU usage, and page faults) and stability evaluations (which may measure the stability of a computing system by determining, for example, the number of operating-system, application, and service errors experienced by the computing system).

Step 304 in FIG. 3 may be performed in a variety of ways. For example, health-evaluation module 106 in FIG. 1 may, after application-detection module 104 detects an application in step 302, perform a first system-health evaluation of client 202 in FIG. 2. An illustration of the results of an exemplary first system-health evaluation 400 that may be performed by health-evaluation module 106 is provided in FIG. 4. As illustrated in this figure, first system-health evaluation 400 may comprise a first stability index 402 and a first performance index 412. In certain embodiments, first stability index 402 may comprise a plurality of stability metrics 404 and results 406 for each of these metrics. Stability metrics 404 generally represent any type or form of metric that may be used to measure the stability of a system. Examples of values that stability metrics may measure include, without limitation, operating-system errors (such as blue-screen errors), application errors (such as application hangs), service errors, device-driver errors, system uptime, and system reboots. In the example provided in FIG. 4, first stability index 402 details the average number of blue-screen errors identified by health-evaluation module 106 during the evaluation period (in this case, zero), the average number of service errors identified by health-evaluation module 106 (one), and the average number of application errors identified by health-evaluation module 106 (one). In some embodiments, one or more of these errors may be caused by a conflict between the application detected in step 302 and one or more applications previously installed on the system.

As with first stability index 402, first performance index 412 may comprise a plurality of performance metrics 414 and results 416 for each of these metrics. Performance metrics 414 generally represent any type or form of metric that may be used to measure the performance of a system. Examples of values that performance metrics 414 may measure include, without limitation, CPU usage, page faults, network usage (such as the number of IP datagrams), and memory usage. As illustrated in FIG. 4, the results 406 and 416 of stability metrics 404 and performance metrics 414 may be represented using running averages, maximum or peak values, incremental count values, or any other suitable method. In the example provided in FIG. 4, first performance index 412 details the computing system's maximum and average CPU usage during the evaluation period (in this case, 7 and 2.1875, respectively), the maximum and average number of page faults experienced by the system during the evaluation period (844 and 248.4375, respectively), and the maximum and average number of IP datagrams sent and received by the system during the evaluation period (8 and 3.25, respectively).

In certain embodiments, the first system-health evaluation detailed in step 304 may be performed before the application identified in step 302 is fully installed on the computing system. In alternative embodiments, this first system-health evaluation may be performed immediately after the application is fully installed on the system. In at least one embodiment, the first system-health evaluation performed in step 304 may be stored in a database, such as health-evaluations database 122 in FIG. 1.

Returning to FIG. 3, at step 306 the application detected in step 302 may be installed on the system, such as client 202 in FIG. 2. The term "installation," as used herein, generally refers to the act of loading an application onto a computing system so that it can be executed. In certain embodiments, an application may be installed using a formal installer that may automatically perform various functions necessary to allow the application to be executed, such as unpacking files associated with the application, changing various system settings on the computing system, and the like. In alternative embodiments, an application may be installed simply by copying an application's files to a desired location on the computing system.

After the application is installed, at step 308 a second system-health evaluation may be performed. For example, health-evaluation module 106 in FIG. 1 may, after a new application is installed on client 202, perform a second system-health evaluation in order to determine whether the new application impacted the health of client 202. An illustration of the results of a second system-health evaluation 420 that may be performed by health-evaluation module 106 is provided in FIG. 4. As illustrated in this figure, second system-health evaluation 420 may comprise a second stability index 422 containing results 426 for a plurality of stability metrics 424 and a second performance index 432 containing results 436 for a plurality of performance metrics 434.

In the example provided in FIG. 4, second stability index 422 details the average number of blue-screen errors (zero), service errors (two), and application errors (three) identified by health-evaluation module 106 subsequent to installation of the application in step 306. Similarly, second performance index 432 details the computing system's maximum and average CPU usage subsequent to installation of the application (58 and 10.1999, respectively), the maximum and average number of page faults experienced by the system subsequent to installation of the application (3423 and 960.85, respectively), and the maximum and average number of IP datagrams sent and received by the system subsequent to installation of the application (9 and 3.25, respectively).

The second system-health evaluation detailed in step 308 may be performed either upon the expiration of a predetermined period of time or upon the occurrence of some specified event. For example, a second system-health evaluation may be performed one week after installation of the application on the computing system. Alternatively, this second system-health evaluation may be performed after detecting, but before installing, a second new application (i.e., a new application that is different from the application detected in step 302). This second system-health evaluation may also be performed after detecting, but immediately after installing, the second new application. In at least one embodiment, the second system-health evaluation performed in step 308 may be stored in a database, such as health-evaluations database 122 in FIG. 1.

Returning to FIG. 3, at step 310 the results of the second system-health evaluation from step 308 may be compared with the results of the first system-health evaluation from step 304 to determine whether the application impacted the health of the system. Step 310 may be performed in a variety of ways. For example, in certain embodiments system-impact-determination module 108 in FIG. 1 may compare the results of a first system-health evaluation, such as first system-health evaluation 400 in FIG. 4, with the results of a second, subsequent system-health evaluation, such as second system-health evaluation 420 in FIG. 4, to determine whether an application installed on client 202 in FIG. 2 has negatively impacted the health (e.g., the stability or performance) of client 202.

The impact an application may have on a system may be expressed or quantified in a variety of ways. In certain embodiments, one or more system-health-impact scores, such as system-health-impact scores 440 in FIG. 4, may be calculated based on first system-health evaluation 400 and second system-health evaluation 420. As illustrated in FIG. 4, system-health-impact scores 440 may represent the impact an application has on the stability (as represented by the results contained in stability-impact table 442) and performance (as represented by the results contained in performance-impact table 446) of a system. For example, the results in stability-impact table 442 may demonstrate whether there has been a percentage increase in blue-screen errors, service errors, and/or application errors subsequent to installation of the application. Similarly, the results in performance-impact table 446 may demonstrate whether there has been a percentage increase in CPU usage, memory usage, page faults, and/or network usage subsequent to installation of the application.

For example, in the example provided in FIG. 4, the results contained in stability-impact table 442 demonstrate that there has been a 50% increase in the average number of service and application-related errors experienced by the system subsequent to installation of the application. Similarly, the results contained in performance-index table 446 demonstrate that there has been a significant increase in average CPU usage (78.5539%), maximum CPU usage (87.9130%), average number of page faults (74.1440%), maximum number of page faults (75.3433%), and maximum number of IP datagrams (11.1111%) subsequent to installation of the application.

In at least one embodiment, an average stability-impact score may be calculated for the application by averaging the results contained in stability-impact table 442 (which, in the example illustrated in FIG. 4, results in an average stability-impact score of −33.3333%). Similarly, an average performance-impact score for the application may be calculated by averaging the results contained in performance-impact table 446 (which, in the example illustrated in FIG. 4, results in an average performance-impact score of −55.5109%). An overall system-health-impact score for the application may then be calculated by averaging the average-stability-impact score with the average-performance-impact score (which, in the example illustrated in FIG. 4, results in an overall system-health-impact score of −44.4421%). In at least one embodiment, one or more of system-health-impact scores 440 in FIG. 4 may be stored in a database, such as health-impact-score database 124.

One or more of steps 302-310 in FIG. 3 may be performed by a local system (such as client 202 in FIG. 2 and/or computing system 1010 in FIG. 10), by a remote system (such as such as server 206 in FIG. 2 and/or portions of exemplary network architecture 1100 in FIG. 11), or any combination thereof. For example, a local system, such as client 202 in FIG. 2 and/or computing system 1010 in FIG. 10, may determine whether a new application impacted the health of a computing system in step 310 by comparing the results of the first system-health evaluation with the results of the second system-health evaluation. Alternatively, a remote computing device, such as server 206 in FIG. 2 and/or portions of exemplary network architecture 1100 in FIG. 11, may determine whether a new application impacted the health of a computing system in step 310 by comparing the results of the first system-health evaluation with the results of the second system-health evaluation.

Figure 5:
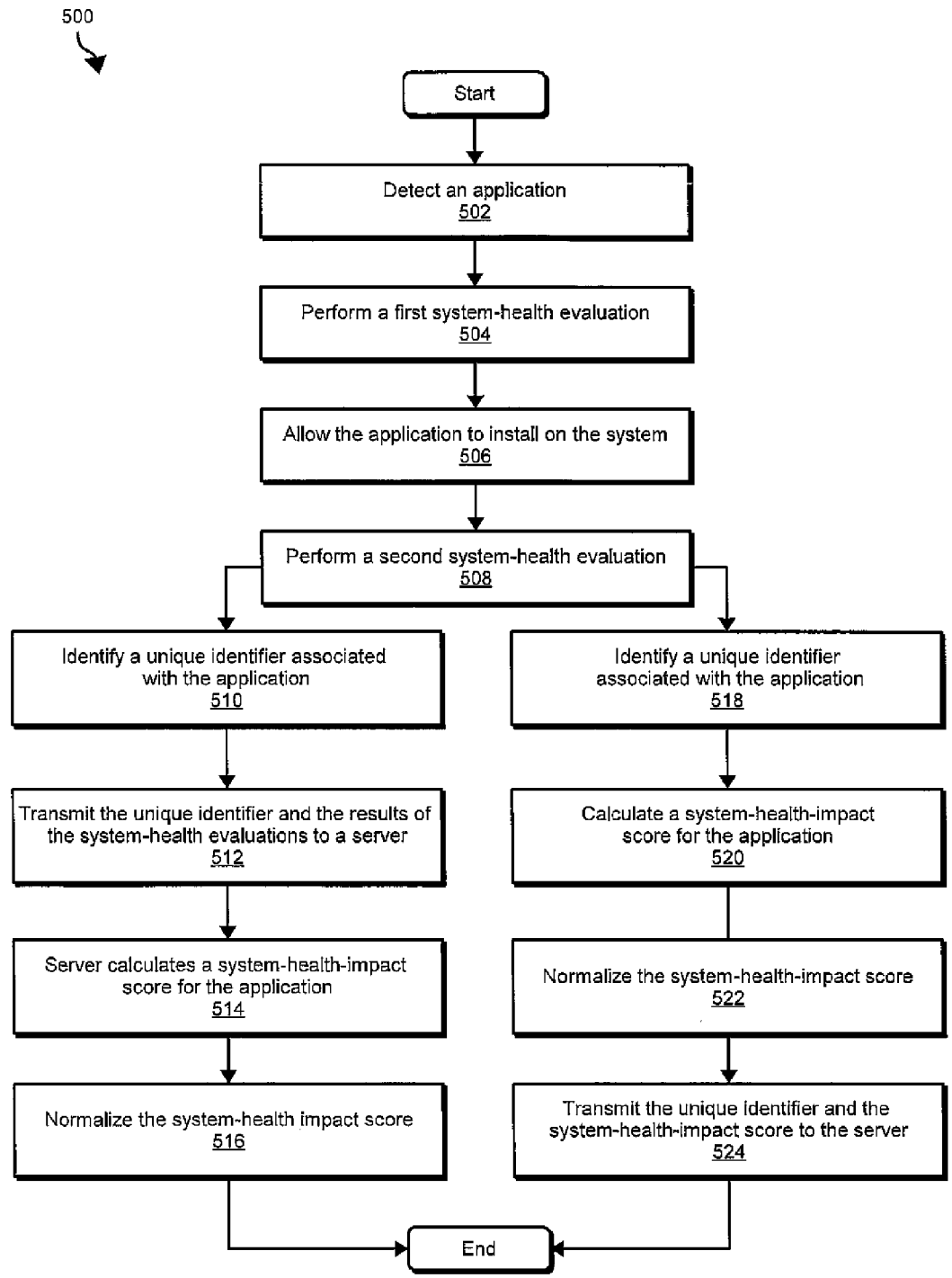
FIG. 5 is a flow diagram of an exemplary computer-implemented method for determining whether an application installed on a computing system impacted the health of the system according to an additional embodiment.

FIG. 5 is a flow diagram of an exemplary computer-implemented method 500 in which a local system, such as client 202 in FIG. 2, and a remote system, such as server 206 in FIG. 2, perform one or more steps of the method. As illustrated in this figure, at step 502 a new application may be detected. For example, application-detection module 104 in FIG. 1 may detect a new application downloaded onto, loaded onto, or stored on client 202 in FIG. 2. At step 504, the current state of health of the computing system may be determined by performing a first system-health evaluation. For example, health-evaluation module 106 in FIG. 1 may, after application-detection module 104 detects an application in step 502, perform a first system-health evaluation (such as first system-health evaluation 400 in FIG. 4) for client 202 in FIG. 2.

At step 506, the application detected in step 502 may be installed on the system. For example, application-detection module 104 in FIG. 1 may allow, after health-evaluation module 106 in FIG. 1 performs a first system-health evaluation, the application detected in step 502 to be installed on client 202 in FIG. 2. After the application is installed, at step 508 a second system-health evaluation may be performed. For example, health-evaluation module 106 in FIG. 1 may, after the new application is installed on client 202, perform a second system-health evaluation of client 202 in order to determine whether the new application impacted the health of client 202.

As detailed above, the impact an application has on the health of a computing system may be determined in a variety of ways. For example, in certain embodiments the results of a plurality of system-health evaluations may be transmitted to a server or a backend, such as server 206 in FIG. 2, which may compare the results of these system-health evaluations in order to determine whether the application impacted the health of the computing system. If the results of system-health evaluations are to be compared by a server or a backend, then control proceeds from step 508 in FIG. 5 to step 510. At step 510, a unique identifier associated with the application may be identified. The phrase "unique identifier," as used herein, generally refers to any type or form of identifier (such as a token or symbol) for representing an application. Examples of unique identifiers include, without limitation, checksums, hashes, program names, and the like. Unique identifiers may be identified in a variety of ways. For example, application-detection module 104 in FIG. 1 may identify a unique identifier associated with an application downloaded to client 202 in FIG. 2 by identifying the name of the application, calculating a hash or checksum for an installer for the application, or the like.

At step 512, the results of both system-health evaluations (i.e., first system-health evaluation in step 504 and second system-health evaluation in step 508) may be transmitted, along with the unique identifier from step 510, to a server or a backend. For example, communication module 110 in FIG. 1 may cause client 202 in FIG. 2 to transmit the results of the first and second system-health evaluations, along with the unique identifier for the application identified in step 510, to server 206 in FIG. 2. In at least one embodiment, the results of these system-health evaluations may be stored in a database, such as health-evaluations database 122 in FIG. 1.

At step 510, the server may determine whether the application impacted the health of the system by comparing the second system-health evaluation with the first system-health evaluation. For example, system-impact-determination module 108 in FIG. 1 may cause server 206 in FIG. 2 to calculate one or more system-health-impact scores, such system-health-impact scores 440 in FIG. 4, for the application by comparing the first system-health evaluation from step 504 with the second system-health evaluation from step 508. The server or backend may store the resulting system-health-impact score or scores in a database, such as health-impact-score database 124 in FIG. 1.

At step 516, the server or backend may normalize the system-impact-health score or scores. The terms "normalize" and "normalization," as used herein, generally refers to any process that allows multiple sets of data to be accurately compared. As will be explained in greater detail below, in at least one embodiment this normalization process may allow system-impact-health scores obtained from a plurality of systems, each of which may have varying characteristics (such as processor speeds, memory amounts, and the like), to be accurately compared. System-health impact scores may be normalized using any feasible normalization method. For example, the average CPU-usage-impact score for an application (such as the average CPU-usage-impact score contained in performance-impact table 446 in FIG. 4) may be normalized by dividing the average CPU impact score by the processor speed of the system, resulting in a per-MHz CPU-usage-impact score.

In certain embodiments, system-health-impact score or scores may also be normalized based on the length of time between the first system-health evaluation and the second system-health evaluation. For example, system-health-impact scores obtained from a first computing device (in which the length of time between the first system-health evaluation and the second system-health evaluation was six hours) and a second computing device (in which the length of time between the first system-health evaluation and the second system-health evaluation was 24 hours) may be normalized in order to allow the system-health-impact scores from these two systems to be accurately compared.

In at least one embodiment, normalizing the system-health-impact score or scores may also comprise determining whether the system called or executed the installed application before the second system-health evaluation in step 508 was performed. In at least one embodiment, a higher confidence level may be assigned to system-health-impact scores calculated for an application if the application was called or executed by the system during the evaluation period, since such a situation may provide a more accurate representation of the impact of the application on the health of the system. Similarly, a lower confidence level may be assigned to system-health-impact scores calculated for an application if the application was not called or executed by the system during the evaluation period. Again, as with the previous normalization example described above, this process may allow system-impact-health scores obtained from a plurality of systems to be accurately compared.

As detailed above, either a client-side system or a server-side system may determine the impact of a new application on the health of a system by comparing the results of a plurality of system-health evaluations. If a client-side system, such as client 202 in FIG. 2, is to determine whether a new application impacted the health of the client-side system, then, upon completion of step 508 in FIG. 5, control may proceed to step 518 where a unique identifier associated with the application may be identified. For example, application-detection module 104 in FIG. 1 may identify a unique identifier associated with an application downloaded to client 202 in FIG. 2 by identifying the name of the application, calculating a hash or checksum for an installer for the application, or the like.

At step 520, the client-side system may determine whether the application impacted the health of the client-side system by comparing the results of the second system-health evaluation from step 508 with the results of the first system-health evaluation from step 504. For example, system-impact-determination module 108 in FIG. 1 may cause client 202 in FIG. 2 to calculate one or more system-health-impact scores, such as system-health-impact scores 440 in FIG. 4, by comparing first system-health evaluation 400 with second system-health evaluation 420.

At step 522, the client-side system may normalize the system-impact-health score or scores calculated in step 520. At step 524, the client-side system may transmit the normalized system-health-impact score or scores calculated in step 520, along with the unique identifier identified in step 518, to a server. For example, communication module 110 in FIG. 1 may cause client 202 in FIG. 2 to transmit system-health-impact scores 440 in FIG. 4, along with the unique identifier associated with the application detected in step 518, to server 206 in FIG. 2. In at least one embodiment, the system-health-impact scores 440 received from client 202 in FIG. 2 may be stored by server 206 in a database, such as health-impact-score database 124 in FIG. 1. Upon completion of steps 516 and/or 524 in FIG. 5, control of exemplary method 500 may terminate.

Figure 6:
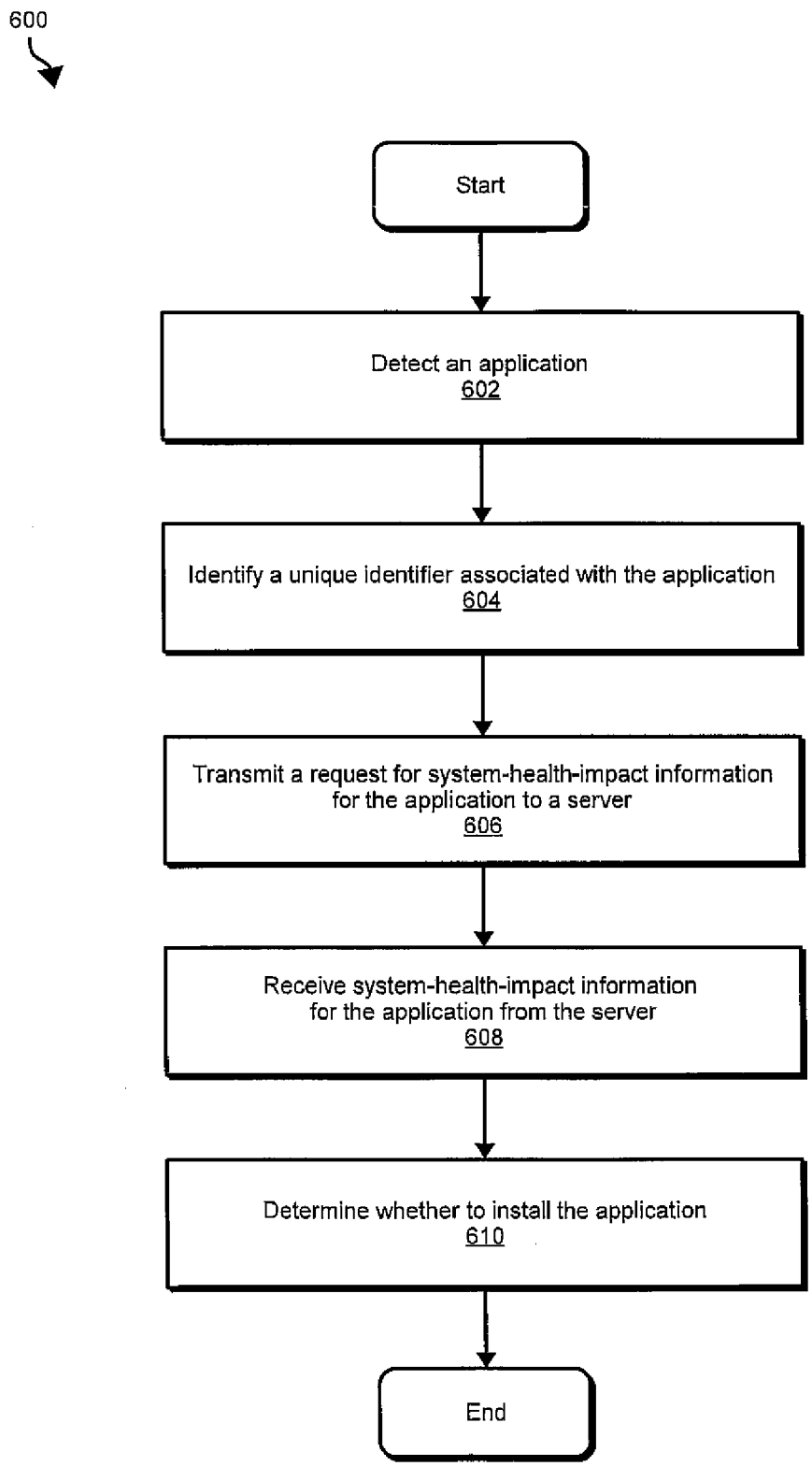
FIG. 6 is a flow diagram of an exemplary computer-implemented method for determining the potential impact of an application on the health of a system according to at least one embodiment.

As detailed above, exemplary systems 100 and 200 in FIGS. 1 and 2 may be used to determine the potential impact of an application on the health of a system based on information obtained from additional computing systems (potentially millions) on which the application has previously been installed. FIG. 6 is a flow diagram of an exemplary computer-implemented method 600 for determining the potential impact of an application on the health of a system based on information obtained from additional computing systems on which the application has previously been installed. As illustrated in this figure, at step 602 an application may be detected. For example, application-detection module 104 in FIG. 1 may detect a new application downloaded to, loaded onto, or stored on client 202 in FIG. 2.

At step 604, a unique identifier associated with a new application may be identified. For example, application-detection module 104 in FIG. 1 may identify a unique identifier associated with the new application downloaded to or stored on client 202 in FIG. 2 by identifying the name of the application, by calculating a hash or checksum for an installer for the application, or the like.

At step 606, a request for system-health-impact information for the application detected in step 602 may be transmitted to a server. For example, application-detection module 104 and/or communication module 110 in FIG. 1 may cause client 202 in FIG. 2 to transmit a request for system-health-impact information for the application detected by application-detection module 104 in FIG. 1 to server 206 in FIG. 2. In at least one embodiment, this request may contain the unique identifier identified in step 604.

At step 608, system-health-impact information for the application may be received from a server or backend. The phrase "system-health-impact information" generally refers to any type or form of information that may be used to determine the potential impact of an application of the health of a system. Examples of system-health-impact information include, without limitation, a system-health-impact score for the application (which, as will be described in greater detail below, may be based on system-health-impact information obtained from a plurality of additional computing systems) or any other potentially useful information. System-health-impact information for an application may be received from a server in a variety of ways. For example, communication module 110 operating on client 202 in FIG. 2 may receive system-health-impact information for an application from server 206 in FIG. 2 via network 204.

At step 610, the system may determine, based on the system-health-impact information received from the server, whether to install the application. Step 610 may be performed in a variety ways. In one embodiment, determining whether to install the application may comprise displaying the system-health-impact information received in step 608 to a user and prompting the user to allow or deny installation of the application.

Figure 7:
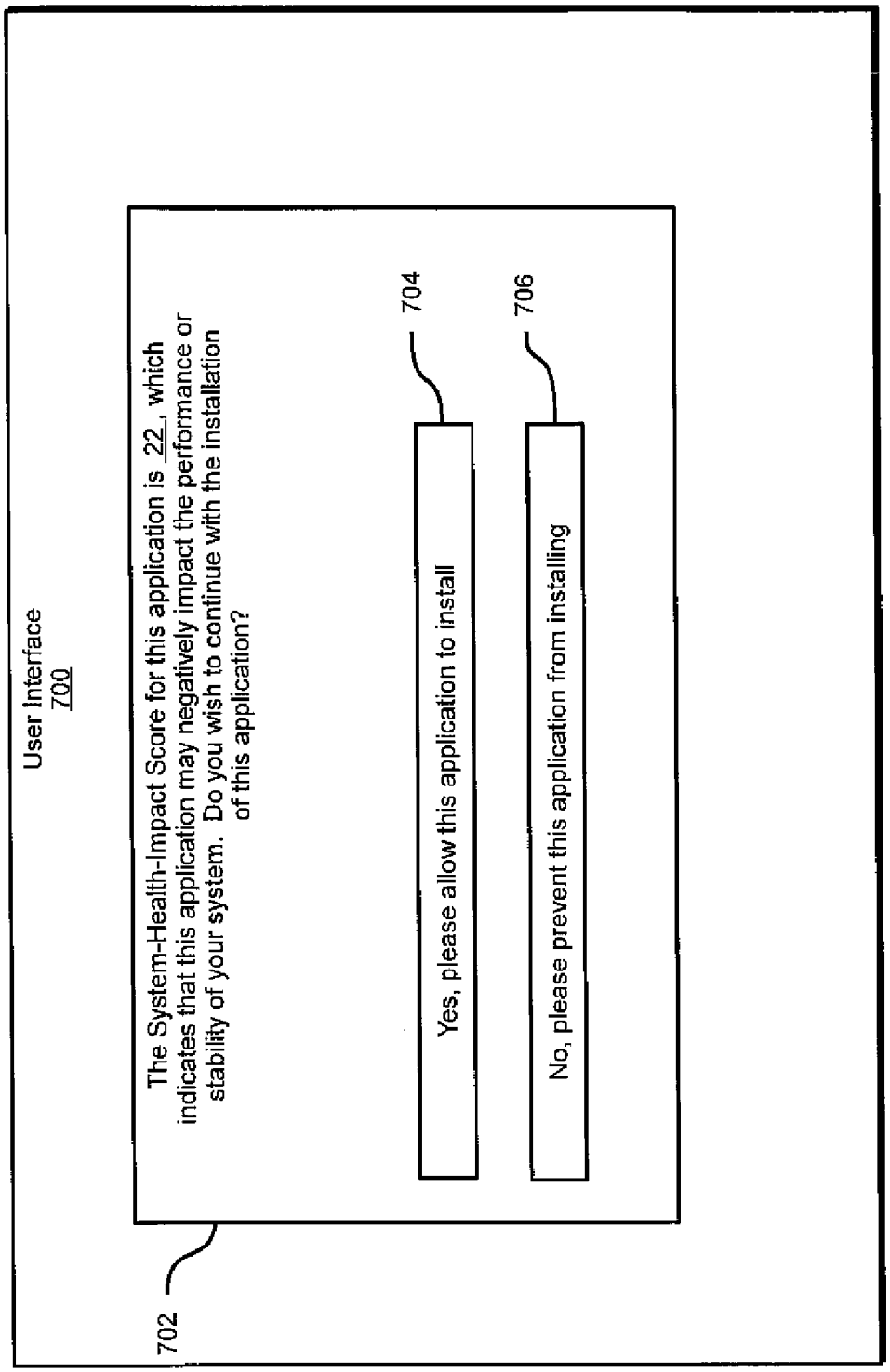
FIG. 7 is a block diagram of an exemplary user interface according to at least one embodiment.

For example, user-interface module 112 in FIG. 1 may provide a user interface, such as user interface 700 in FIG. 7, for displaying system-health-impact information for an application to a user. As illustrated in FIG. 7, user interface 700 may comprise an explanatory textbox 702 and one or more user-selectable objects 704 and 706. In one example, explanatory textbox 702 may display at least a portion of the system-health-impact information received from the server in step 608. For example, explanatory textbox 702 may display a system-health-impact score for an application. After reviewing the system-health-impact information displayed in explanatory textbox 702, a user may allow the application to be installed on the system by selecting user-selectable object 704. Alternatively, if the user wishes to prevent the application from being installed on the system, then the user may select user-selectable object 706.

User interface 700 in FIG. 7 generally represents any type or form of user interface. Examples of user interface 700 include, without limitation, a graphical user interface executed by a client-side computing device, such as client 202 in FIG. 2, a website hosted by a server-side computing device, such as server 206 in FIG. 2, or any other suitable user interface.

In an additional embodiment, step 610 in FIG. 6 may be automatically performed by a module, such as system-impact determination module 108 in FIG. 1, residing on a user's computing device, such as client 202 in FIG. 2. In this embodiment, system-impact-determination module 108 in FIG. 1 may determine whether the system-health-impact information received from the server in step 608 satisfies predetermined criteria. For example, system-impact-determination module 108 may determine whether a system-health-impact score for the application received from server 206 in FIG. 2 exceeds a predetermined threshold, such as 50%. If the system-health-impact score is less than this predetermined threshold, then system-impact-determination module 108 may prevent the application from installing on the system. However, if the system-health-impact score for the application exceeds this predetermined threshold, then system-impact-determination module 108 may allow the application to be installed on the system.

As detailed above, exemplary systems 100 and 200 in FIGS. 1 and 2 may be used to calculate a system-health-impact score for an application based on information gathered from a plurality of systems (potentially millions) on which the application has been installed. FIG. 8 is a flow diagram of an exemplary computer-implemented method 800 for calculating a system-health-impact score for an application based on information gathered from a plurality of systems on which the application has been installed. As illustrated in this figure, at step 802 system-health-impact information for an application may be received from a first system. For example, as illustrated in FIG. 9, server 910 may receive system-health-impact information for an application installed on first client 902 from first client 902 via network 908. As detailed above, the phrase "system-health-impact information" generally refers to any type or form of information that may be used to determine the impact of an application on a system's health. Examples of system-health-impact information include, without limitation, the results of system-health-evaluations, system-health-impact scores, and any other potentially useful information. In at least one embodiment, system-health-impact information may also include a unique identifier for an application.

At step 804, system-health-impact information for the same application may be received from a second system. For example, server 910 in FIG. 9 may receive system-health-impact information for the same application detailed in step 802 from second client 904 via network 908.

At step 806, a system-health-impact score for the application may be calculated based on the system-health-impact information received from both the first system and the second system. As detailed above in connection with FIGS. 3 and 4, system-health-impact scores maybe calculated in a variety of ways. In one embodiment, server 910 in FIG. 9 may calculate one or more system-health-impact scores for an application installed on first client 902 by comparing the results of a plurality of system-health evaluations (such as first and second system-health evaluations 400 and 420 in FIG. 4) received from first client 902. Server 910 in FIG. 9 may then calculate one or more system-health-impact scores for the same application installed on second client 904 by comparing the results of a plurality of system-health evaluations received from second client 904. Server 910 may then calculate an overall system-health-impact score for the application by averaging the system-health-impact scores derived from the system-health-impact information received from first client 902 and second client 904.

As detailed above, system-health-impact scores for an application may be calculated by a local computing system, such as first client 902 and second client 904 in FIG. 9. In this embodiment, server 910 in FIG. 9 may receive system-health-impact scores for the same application from first client 902 and second client 904 via network 908. In this example, server 910 may calculate an overall system-health-impact score for the application by averaging the system-health-impact scores received from first client 902 and second client 904.

As detailed above, in certain embodiments the system-health-impact information received from the first and second systems in step 802 and 804 may be normalized by the server to allow this information to be accurately compared. Alternatively, the system-health-impact information received from the first and second systems in steps 802 and 804 may be normalized by the first and second systems prior to transmitting this information to the server. In at least one embodiment, the server may store the system-health-impact score calculated in step 806 in a database, such as health-impact-score database 124. In certain embodiments, a unique identifier associated with the application may also be stored with the system-health-impact score for the application in the database.

Returning to FIG. 8, at step 808 a request from a third system for the system-health-impact score calculated in step 806 may be received. For example, server 910 in FIG. 9 may receive a request from third client 906 via network 908 for a system-health-impact score for an application. In at least one embodiment, the request received from this third system may contain a unique identifier associated with the application. In response to this request, at step 810 the system-health-impact score for the application may be transmitted to the third system. For example, server 910 in FIG. 9 may transmit the system-health-impact score calculated in step 806 for the application to third client 906 via network 908. As detailed above in connection with FIG. 6, third client 906 may then determine whether to install the application based on the system-health-impact score received from server 910.

Figure 10:
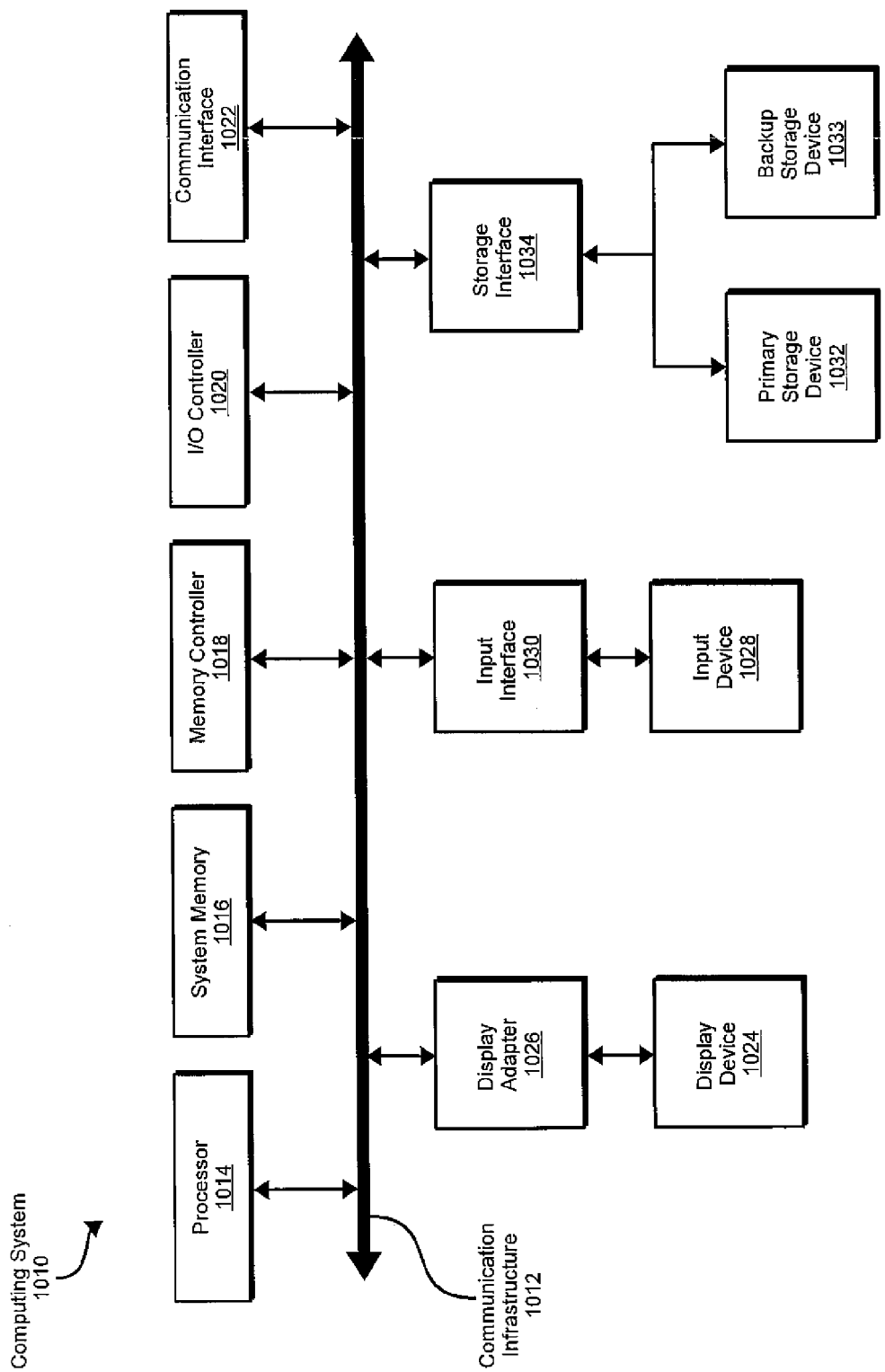
FIG. 10 is a block diagram of an exemplary computing system capable of implementing one or more of the embodiments described and/or illustrated herein.

FIG. 10 is a block diagram of an exemplary computing system 1010 capable of implementing one or more of the embodiments described and/or illustrated herein. Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may comprise at least one processor 1014 and a system memory 1016.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the exemplary embodiments described and/or illustrated herein. For example, processor 1014 may perform and/or be a means for performing, either alone or in combination with other elements, one or more of the detecting, performing, allowing, comparing, creating, identifying, transmitting, calculating, normalizing, determining, receiving, displaying, prompting, and preventing steps described herein. Processor 1014 may also perform and/or be a means for performing any other steps, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may comprise both a volatile memory unit (such as, for example, system memory 1016) and a non-volatile storage device (such as, for example, primary storage device 1032, as described in detail below).

In certain embodiments, exemplary computing system 1010 may also comprise one or more components or elements in addition to processor 1014 and system memory 1016. For example, as illustrated in FIG. 10, computing system 1010 may comprise a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an ISA, PCI, PCIe, or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller may perform and/or be a means for performing, either alone or in combination with other elements, one or more of the steps or features described and/or illustrated herein, such as detecting, performing, allowing, comparing, creating, identifying, transmitting, calculating, normalizing, determining, receiving, displaying, prompting, and preventing.

I/O controller 1020 generally represents any type or form of module capable of coordinating and/or controlling the input and output functions of a computing device. For example, in certain embodiments I/O controller may control or facilitate transfer of data between one or more elements of computing system 1010, such as processor 1014, system memory 1016, communication interface 1022, display adapter 1026, input interface 1030, and storage interface 1034. I/O controller 1020 may be used, for example, to perform and/or be a means for performing, either alone or in combination with other elements, one or more of the detecting, performing, allowing, comparing, creating, identifying, transmitting, calculating, normalizing, determining, receiving, displaying, prompting, and preventing steps described herein. I/O controller 1020 may also be used to perform and/or be a means for performing other steps and features set forth in the instant disclosure.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network comprising additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution. In certain embodiments, communication interface 1022 may perform and/or be a means for performing, either alone or in combination with other elements, one or more of the detecting, performing, allowing, comparing, creating, identifying, transmitting, calculating, normalizing, determining, receiving, displaying, prompting, and preventing steps disclosed herein. Communication interface 1022 may also be used to perform and/or be a means for performing other steps and features set forth in the instant disclosure.

As illustrated in FIG. 10, computing system 1010 may also comprise at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also comprise at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device. In at least one embodiment, input device 1028 may perform and/or be a means for performing, either alone or in combination with other elements, one or more of the detecting, performing, allowing, comparing, creating, identifying, transmitting, calculating, normalizing, determining, receiving, displaying, prompting, and preventing steps disclosed herein. Input device 1028 may also be used to perform and/or be a means for performing other steps and features set forth in the instant disclosure.

As illustrated in FIG. 10, exemplary computing system 1010 may also comprise a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage devices 1032 and 1033 and other components of computing system 1010.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also comprise other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

In certain embodiments, the exemplary file systems disclosed herein may be stored on primary storage device 1032, while the exemplary file-system backups disclosed herein may be stored on backup storage device 1033. Storage devices 1032 and 1033 may also be used, for example, to perform and/or be a means for performing, either alone or in combination with other elements, one or more of the detecting, performing, allowing, comparing, creating, identifying, transmitting, calculating, normalizing, determining, receiving, displaying, prompting, and preventing steps disclosed herein. Storage devices 1032 and 1033 may also be used to perform and/or be a means for performing other steps and features set forth in the instant disclosure.

Many other devices or subsystems may be connected to computing system 1010. Conversely, all of the components and devices illustrated in FIG. 10 need not be present to practice the embodiments described and/or illustrated herein.

The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an application specific integrated circuit (ASIC) adapted to implement one or more of the exemplary embodiments disclosed herein.

Figure 11:
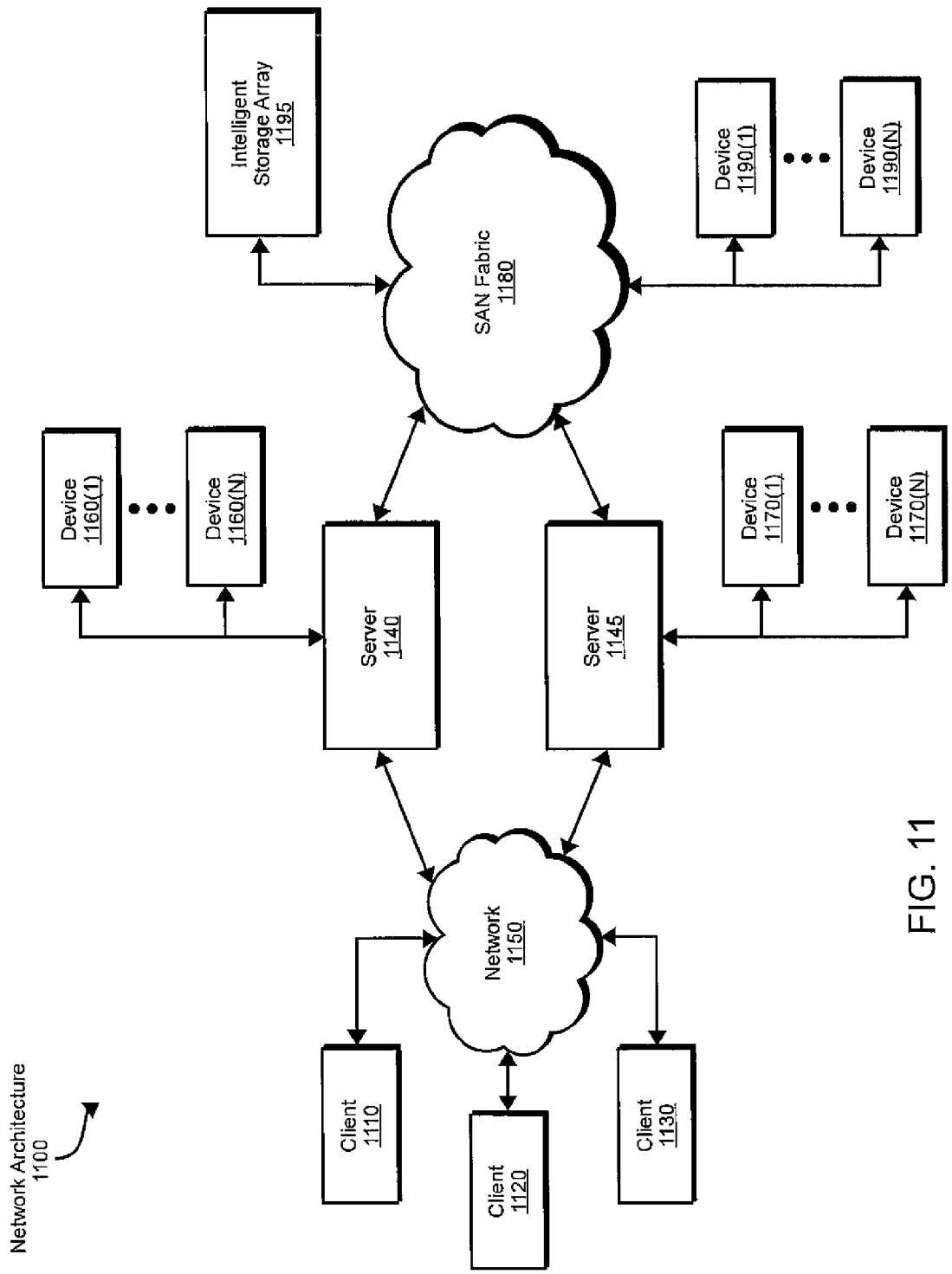
FIG. 11 is a block diagram of an exemplary computing network capable of implementing one or more of the embodiments described and/or illustrated herein.

FIG. 11 is a block diagram of an exemplary network architecture 1100 in which client systems 1110, 1120, and 1130 and servers 1140 and 1145 may be coupled to a network 1150. Client systems 1110, 1120, and 1130 generally represent any type or form of computing device or system, such as exemplary computing system 1010 in FIG. 10. Similarly, servers 1140 and 1145 generally represent computing devices or systems, such as application servers or database servers, configured to provide various database services and/or to run certain software applications. Network 1150 generally represents any telecommunication or computer network; including, for example, an intranet, a wide area network (WAN), a local area network (LAN), a personal area network (PAN), or the Internet.

As illustrated in FIG. 11, one or more storage devices 1160(1)-(N) may be directly attached to server 1140. Similarly, one or more storage devices 1190(1)-(N) may be directly attached to server 1145. Storage devices 1160(1)-(N) and storage devices 1190(1)-(N) generally represent any type or form of storage device or medium capable of storing data and/or other computer-readable instructions. In certain embodiments, storage devices 1160(1)-(N) and storage devices 1190(1)-(N) may represent network-attached storage (NAS) devices configured to communicate with servers 1140 and 1145 using various protocols, such as NFS, SMB, or CIFS.

Servers 1140 and 1145 may also be connected to a storage area network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150. Accordingly, network architecture 1100 may perform and/or be a means for performing, either alone or in combination with other elements, one or more of the detecting, performing, allowing, comparing, creating, identifying, transmitting, calculating, normalizing, determining, receiving, displaying, prompting, and preventing steps disclosed herein. Network architecture 1100 may also be used to perform and/or be a means for performing other steps and features set forth in the instant disclosure.

As detailed above, computing system 1010 and/or one or more of the components of network architecture 1100 may perform and/or be a means for performing, either alone or in combination with other elements, one or more steps of the exemplary methods described and/or illustrated herein. For example, one computer-implemented method for determining whether the application impacts the health of a system may comprise detecting an application, performing a first system-health evaluation, allowing the application to install on the system, performing a second system-health evaluation after allowing the application to install on the system, and comparing the second system-health evaluation with the first system-health evaluation to determine whether the application impacted the health of the system.

In certain embodiments, performing the first system-health evaluation may comprise creating a first performance index based on at least one performance metric and/or a first stability index based on at least one stability metric. Similarly, performing the second system-health evaluation may comprise creating a second performance index based on at least one performance metric and/or a second stability index based on at least one stability metric. In addition, comparing the second system-health evaluation with the first system-health evaluation may comprise comparing the second performance index with the first performance index and/or comparing the second stability index with the first stability index.

The performance metric may comprise processor usage, memory usage, network usage, page faults, or any other potentially useful metric. Similarly, the stability metric may comprise operating-system errors, application errors, service errors, device-driver errors, system uptime, system reboots, or any other potentially useful metric.

In certain embodiments, the method may also comprise identifying a unique identifier associated with the application and, prior to comparing the second system-health evaluation with the first system-health evaluation, transmitting the results of both the first system-health evaluation and the second system-health evaluation, along with the unique identifier, to a server. In certain embodiments, the server may perform the step of comparing the second system-health evaluation with the first system-health evaluation to determine whether the application impacted the health of the system.

In at least one embodiment, comparing the second system-health evaluation with the first system-health evaluation may comprise calculating a system-health-impact score for the application. In addition, the method may also further comprise identifying a unique identifier associated with the application and transmitting the unique identifier and the system-health-impact score to a server. The method may also comprise normalizing the system-health-impact score based on at least one characteristic of the system and/or a period of time between the first system-health evaluation and the second system-health evaluation.

In certain embodiments, the application may be detected before the application is installed on the system. In addition, the first system-health evaluation may be performed before the application is installed on the system. The method may also comprise detecting a second application and performing the second system-health evaluation before the second application is installed on the system.

In certain embodiments, detecting the application may comprise identifying all data, files, and system changes associated with, or that result from installing, the application. The method may also comprise determining whether the system executed the installed application before the second system-health evaluation was performed. In addition, detecting the application may comprise determining whether the application modified at least one setting of the system.

In an additional embodiment, a computer-implemented method for determining the potential impact of an application on the health of a system may comprise detecting an application, identifying a unique identifier associated with the application, transmitting a request for system-health-impact information for the application to a server, receiving the system-health-impact information for the application from the server, and determining, based on the system-health-impact information, whether to install the application.

In certain embodiments, identifying the unique identifier associated with the application may comprise calculating a hash or checksum for the application and/or identifying a program name associated with the application. In addition, determining whether to install the application may comprise displaying the system-health-impact information to a user and then prompting the user to allow or deny installation of the application. Alternatively, determining whether to install the application may comprise determining whether the system-health-impact information satisfies predetermined criteria. If the system-health-impact information satisfies the predetermined criteria, then the system may allow the application to be installed. If, however, the system-health-impact information fails to satisfy the predetermined criteria, then the system may prevent the application from installing.

In an additional embodiment, a computer-implemented method for calculating a system-health-impact score for an application based on information gathered from a plurality of systems may comprise receiving system-health-impact information for an application from a first system, receiving system-health-impact information for the application from a second system, and calculating a system-health-impact score for the application based on the system-health-impact information received from the first system and the system-health-impact information received from the second system.

In certain embodiments, the system-health-impact information received from the first system may comprise a unique identifier associated with the application, the results of a plurality of system-health evaluations performed by the first system, and/or a system-health-impact score for the application calculated by the first system. The method may also comprise receiving a request from a third system for the system-health-impact score for the application and transmitting, in response to the request, the system-health-impact score for the application to the third system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining the potential impact of an application on the health of a client computing device comprising at least one processor, the method comprising:
    detecting, at the client computing device, an application that has yet to be installed on the client computing device;
    identifying, at the client computing device, a unique identifier associated with the application;
    transmitting, from the client computing device to a server, a request for a device-health-impact score for the application, wherein the request uniquely identifies the application using the unique identifier;
    receiving, at the client computing device, the device-health-impact score for the application from the server, wherein the device-health-impact score identifies the potential impact of the application on the health of the client computing device and is calculated based at least in part on information obtained by the server from at least one additional client computing device on which the same application has previously been installed;
    determining, at the client computing device based at least in part on the device-health-impact score received from the server, whether to install the application on the client computing device.

2. The method of claim 1, wherein identifying the unique identifier associated with the application comprises at least one of:
    calculating a hash for the application;
    identifying a program name associated with the application.

3. The method of claim 1, wherein determining whether to install the application on the client computing device comprises:
    displaying the device-health-impact score to a user of the client computing device;
    after displaying the device-health-impact score, prompting the user to allow or deny installation of the application.

4. The method of claim 1, wherein determining whether to install the application on the client computing device comprises:
    determining whether the device-health-impact score satisfies predetermined criteria;
    allowing the application to install on the client computing device if the device-health-impact score satisfies the predetermined criteria;
    preventing the application from installing on the client computing device if the device-health-impact score fails to satisfy the predetermined criteria.

5. The method of claim 1, wherein detecting the application comprises determining whether the application modified at least one setting on the client computing device.

6. The method of claim 1, wherein detecting the application comprises identifying all data, files, and device changes associated with, or that result from installing, the application.

7. A computer-implemented method for calculating a device-health-impact score for an application based on information obtained from a plurality of client computing devices, comprising:
    receiving, at a server, device-health-impact information for the application from a plurality of client computing devices on which the application has previously been installed, wherein the device-health impact information identifies, for each client computing device within the plurality of client computing devices, the impact of the application on the health of the client computing device;

calculating, at the server, a device-health-impact score for the application based at least in part on the device-health-impact information received from the plurality of client computing devices, wherein the device-health-impact score quantifies the impact of the application on the health of the plurality of client computing devices;

receiving, at the server, a request for the calculated device-health-impact score for the application from at least one additional client computing device that has yet to install the application, wherein the request uniquely identifies the application using a unique identifier;

transmitting, in response to the request, the device-health-impact score for the application from the server to the additional client computing device to enable the additional client computing device to determine whether to install the application on the additional client computing device.

8. The method of claim 7, wherein the device-health-impact information received from each client computing device within the plurality of client computing devices comprises at least one of:
   a unique identifier that uniquely identifies the application;
   results of a plurality of device-health evaluations;
   a device-health-impact score for the application.

9. The method of claim 8, wherein each device-health evaluation within the plurality of device-health evaluations involves creating at least one of:
   at least one performance index based on at least one performance metric;
   at least one stability index based on at least one stability metric.

10. The method of claim 9, wherein:
the performance metric measures at least one of:
   processor usage;
   memory usage;
   network usage;
   page faults;
the stability metric measures at least one of:
   operating-system errors;
   application errors;
   service errors;
   device-driver errors;
   device uptime;
   device reboots.

11. The method of claim 7, wherein calculating the device-health-impact score for the application comprises determining, for each client computing device within the plurality of client computing devices, whether the application impacted the health of the client computing device at least in part by:
   identifying a baseline device-health evaluation performed by the client computing device;
   comparing the baseline device-health evaluation with at least one additional device-health evaluation performed by the client computing device after the client computing device installed the application in order to determine whether the application impacted the health of the client computing device.

12. The method of claim 11, wherein at least one of:
   the client computing device performed the baseline device-health evaluation before the application was fully installed on the client computing device;
   the client computing device performed the baseline device-health evaluation immediately after the application was fully installed on the client computing device;
   the client computing device performed the additional device-health evaluation before any additional applications were fully installed on the client computing device.

13. The method of claim 11, further comprising normalizing the device-health-impact score based on at least one of:
   at least one characteristic of at least one of the plurality of client computing devices;
   a period of time between the baseline device-health evaluation and the additional device-health evaluation.

14. The method of claim 11, wherein the device-health-impact score is based at least in part on whether the client computing device executed the application before the additional device-health evaluation was performed.

* * * * *